United States Patent
O'Sullivan et al.

(10) Patent No.: US 8,892,659 B2
(45) Date of Patent: Nov. 18, 2014

(54) ADAPTIVE ELECTRONIC INTRODUCTIONS

(75) Inventors: Patrick J. O'Sullivan, Dublin (IE); Hema Srikanth, Raleigh, NC (US); Carol S. Zimmet, Boxborough, MA (US)

(73) Assignee: International Business Machines Corporation, Armonk, NY (US)

( * ) Notice: Subject to any disclaimer, the term of this patent is extended or adjusted under 35 U.S.C. 154(b) by 1441 days.

(21) Appl. No.: 12/118,400

(22) Filed: May 9, 2008

(65) Prior Publication Data

US 2009/0282107 A1 Nov. 12, 2009

(51) Int. Cl.
*G06F 15/16* (2006.01)
*G06Q 10/00* (2012.01)

(52) U.S. Cl.
CPC .................................. *G06Q 10/00* (2013.01)
USPC ......................................................... 709/206

(58) Field of Classification Search
USPC ........................... 709/206, 217, 219; 705/319
See application file for complete search history.

(56) References Cited

U.S. PATENT DOCUMENTS

| | | | | |
|---|---|---|---|---|
| 6,018,761 | A * | 1/2000 | Uomini | 709/206 |
| 6,694,353 | B2 * | 2/2004 | Sommerer | 709/206 |
| 7,043,531 | B1 * | 5/2006 | Seibel et al. | 709/206 |
| 2002/0052921 | A1 * | 5/2002 | Morkel | 709/206 |
| 2003/0163340 | A1 * | 8/2003 | Fitzpatrick et al. | 705/1 |
| 2005/0096929 | A1 * | 5/2005 | Gelormine et al. | 705/1 |
| 2005/0124320 | A1 * | 6/2005 | Ernst et al. | 455/411 |
| 2006/0129643 | A1 | 6/2006 | Nielson et al. | |
| 2007/0214121 | A1 * | 9/2007 | Ebanks | 707/3 |
| 2007/0266156 | A1 * | 11/2007 | Wilkins | 709/225 |
| 2008/0005282 | A1 * | 1/2008 | Gaedcke | 709/219 |
| 2008/0205655 | A1 * | 8/2008 | Wilkins et al. | 380/279 |
| 2008/0250332 | A1 * | 10/2008 | Farrell et al. | 715/753 |

FOREIGN PATENT DOCUMENTS

JP 2001344386 12/2001

OTHER PUBLICATIONS

Wales, Jennifer; "Upgrading to IBM Lotus Sametime V7.5"; Jan. 16, 2007; http://www.ibm.com/developerworks/lotus/library/sametime-upgrade/.
"LinkedIn"; On-Line Encyclopedia; Wikipedia; http://en.wikipedia.org/wiki/LinkedIn.
"Facebook"; On-Line Encyclopedia; Wikipedia; http://en.wikipedia.org/wiki/Facebook.

* cited by examiner

*Primary Examiner* — Michael Chao
(74) *Attorney, Agent, or Firm* — Steven L. Nichols; Van Cott, Bagley, Cornwall & McCarthy P.C.

(57) ABSTRACT

A method for providing electronic introductions includes providing, with an electronic communication, an electronic introduction that gives additional information regarding a party to the electronic communication that is in addition to the electronic identification of that party. A system for providing an electronic introduction may include a computer configured to search at least one database for information about a party being introduced and compile an electronic introduction for the party incorporating the information; and an electronic communication function configured to provide access to the electronic introduction to a recipient of an electronic communication sent by the party using the electronic communication function.

7 Claims, 8 Drawing Sheets

ADAPTIVE ELECTRONIC INTRODUCTIONS

BACKGROUND OF THE INVENTION

Business relationships typically start with an introduction between two parties. The introduction serves as a means for learning about the other party's trustworthiness, expertise, experience, and personality. In subsequent interactions, relevant information continues to be shared between the two parties. For example, this shared information may include more details about the individuals, what is new since the last interaction, restatements of key points in previous interactions, and additional context about past interactions.

However, as electronic interactions increase, people often meet each other through electronic exchanges. These electronic exchanges have no concept of an introduction. Consequently, a person who receives an electronic communication from an unfamiliar sender may have to spend additional time and effort to ascertain the identity and characteristics of the sender so as to determine how to respond to the sender's communication.

BRIEF SUMMARY OF THE INVENTION

A method for providing adaptive electronic introductions may include gathering introduction information, communicating to a recipient that the electronic introduction is available, displaying the electronic introduction at a request of the recipient; and automatically updating the introduction. A computer program product for providing adaptive electronic introductions includes computer usable program code configured to: gather and assemble information into an electronic introduction; associate the electronic introduction with a communication from a sender to a recipient; display the electronic introduction on request from the recipient; and automatically update the electronic introduction.

BRIEF DESCRIPTION OF THE SEVERAL VIEWS OF THE DRAWINGS

The accompanying drawings illustrate various embodiments of the principles described herein and are a part of the specification. The illustrated embodiments are merely examples and do not limit the scope of the claims.

Throughout the drawings, identical reference numbers designate similar, but not necessarily identical, elements.

DETAILED DESCRIPTION OF THE INVENTION

As will be appreciated by one skilled in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Business interactions are commonly based on interpersonal relationships. A relationship typically begins with an introduction between the two parties. During a traditional introduction, either party can ask the other questions about that party's background, current status or position, interests, specialties, etc. Consequently, introductions are an effective method to learn about the other party's trustworthiness, expertise, experience, and personality. After an introduction, the introduced party is more easily remembered and decisions about how to interact with the introduced party can be more efficiently made. During succeeding interactions the parties continue to share relevant information building on the information exchanged during the initial introduction. For example, this relevant information may include more details about the individuals, what is new since the last interaction, restatements of key points in previous interactions, and additional context for information conveyed previously.

However, in modern professional interactions, people all too frequently first meet each other through electronic exchanges, such as e-mail. These electronic exchanges do not include anything like the traditional concept of an introduction, where a recipient can learn more about the contacting user's background. In the e-mail example, an individual may write to one or more other people whom that individual has never met and share information, or more likely, request some level of support from one or more of the people contacted. The initiating user sends the e-mail and expects a response, even without establishing the initial rapport or agreement for support.

Often times, when the recipient doesn't know the originator, some research may be conducted to determine how and whether to respond. Such research attempts to answer the questions that would normally be addressed in a traditional introduction. For example, the recipient may want to know, and may attempt to discover by research, (1) the originator's organization or organization description, (2) the originator's job title or job description; (3) the originator's scope of responsibility, for example, if the originator is a manager, the projects and number of people for which the originator is responsible; and (4) historical information about the originator such as how long the originator has been in his or her current position, organization, or company and what have they done before. The recipient may also perform a web search to acquire such information about the individual. However, some of this information, if recorded at all, may be contained within organizational databases which are unavailable to outside recipients. This research consumes valuable time and may not be thorough or directed to appropriate information, or may be seeking information that is simply not available to the recipient researcher.

The adaptive electronic introduction described below solves the challenge of learning about and "meeting" a new person through an electronic interchange. The adaptive electronic introduction provides key information that a receiving user needs and wants to know before responding to a request from a new person. This information is provided in a timely fashion which allows for efficient decision making about how to approach and process incoming collaborative requests for information or work to be done.

The adaptive electronic introduction also provides for appropriate follow-on information during succeeding collaborative exchanges. The adaptive electronic introduction can be configured to maintain a history of interactions between two parties, update information that has changed since the last interaction, and appropriately tailor the scope of the information to the dynamics of the relationship.

As used herein an in the appended claims, the term "electronic communication" will be used broadly to refer to any type of electronic communication between parties including, but not limited to, e-mail, instant messaging, blogging, texting and the like. As used herein and in the appended claims, the term "electronic identification" will be used to refer to the e-mail address, screen name, on-line nickname or other basic identifier used to identify an on-line party or address an electronic communication. As noted above, the present specification describes, among other things, systems and methods for supplementing the electronic identification of an electronic communication with additional information about a party to the electronic communication.

As used herein and in the appended claims, the term "electronic introduction" will refer to a package or information that is included with, or accessible from, an electronic communication that introduces the sender of the electronic communication to its recipient. The electronic introduction is intended to help fill the roll of a traditional introduction that occurs when two people are introduced face-to-face and can, through conversation, obtain information about each other on which to base a relationship. The information in the electronic introduction may be compiled by searching databases for information about the party being introduced. The electronic introduction may also include commonalities between the party being introduced and the recipient by also searching databases for information about the recipient and comparing that information to the information about the party being introduced.

Figure 1:
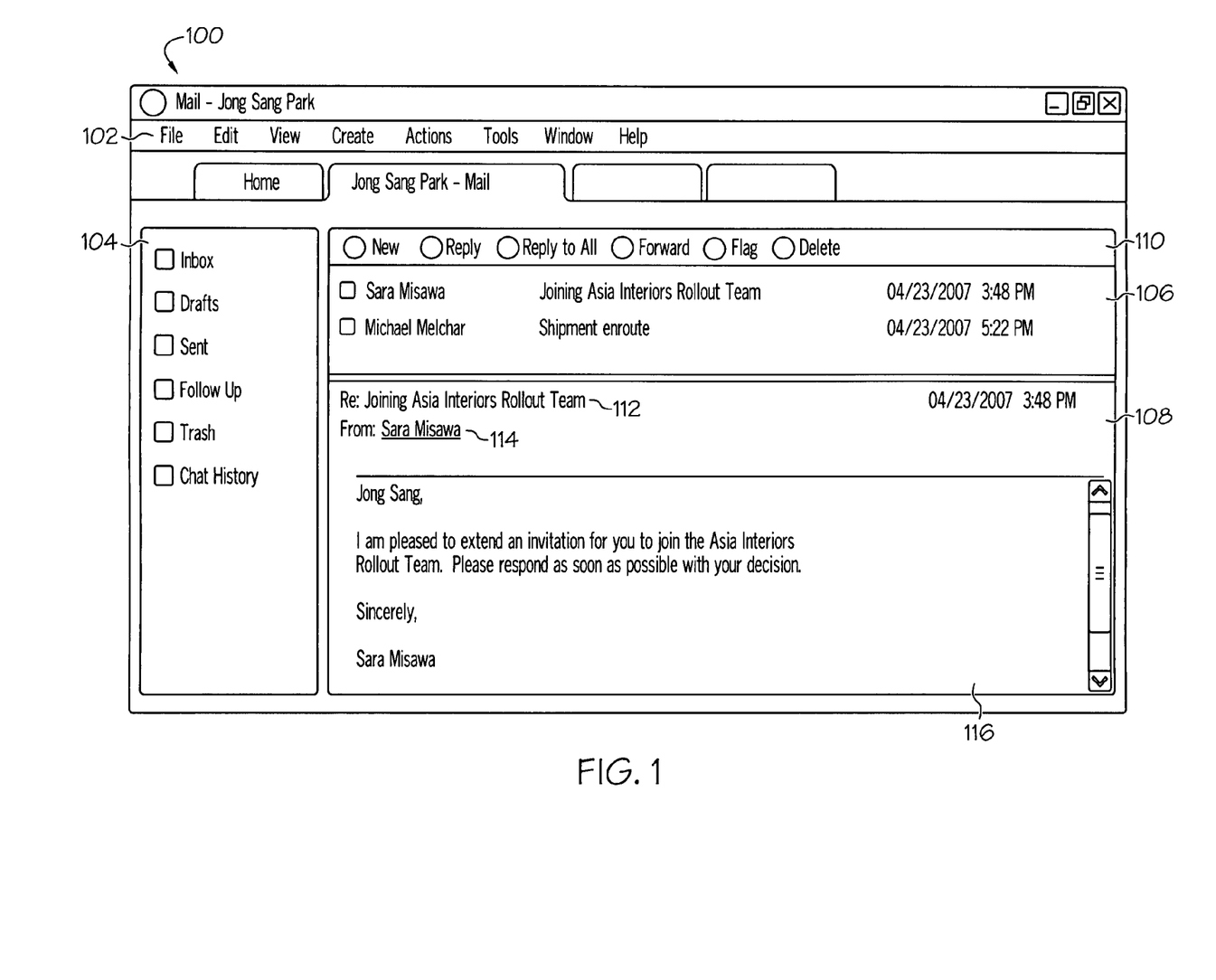
FIG. 1 is an illustrative user interface for an e-mail application, according to one embodiment of principles described herein.

FIG. 1 is an illustrative user interface (100) for an e-mail application. According to one exemplary embodiment, the generic user interface (100) for an e-mail application may include a menu (102) that provides a variety of options and controls, a file/folder structure (104), an e-mail function menu (110), a list of e-mails received (106), and a window (108) which displays the text and other information about a selected e-mail.

The e-mail user, Jong Sang Park in the illustrated example, has received an e-mail from a coworker, Sara Misawa. Jong Sang has selected Sara's e-mail, which is displayed in the window (108). The window display includes a title (112) which describes the subject of the e-mail, a field identifying the sender of the e-mail (114), and the body of the e-mail (116). The title (112) identifies the subject of the e-mail as "Joining Asia Interiors Rollout Team." The sender field (114) identifies Sara Misawa as the person or entity which sent the e-mail. In the body of the text, Sara extends an invitation to Jong Sang to join the Asia Interiors Rollout Team and asks for a response to the invitation. Although Jong Sang Park is a member of the same organization, he has never been personally introduced to Sara and would like additional information about Sara, her authority to extend this invitation, and her leadership experience before committing to become part of her team.

Ordinarily Jong Sang would have to do outside research to gather enough information about Sara and her background to enable him to make a decision. For example, Jong Sang may call his supervisor, open an Internet browser and search for Sara Misawa's name, access an internal employee directory, or search his e-mails for other interactions he may have had with Sara Misawa. However, in this illustrative embodiment, an adaptive electronic introduction is attached to the message. The adaptive electronic introduction contains information about Sara and her background, including her position within the company and her experience in building teams. The adaptive electronic introduction can be accessed in a variety of ways including clicking on an embedded button within the body of the e-mail, activating an attachment to the e-mail, or clicking on a link or activated text. In this case, the sender field (114) contains Sara Misawa's name which is activated text. By mousing over or clicking on Sara Misawa's name, the introduction application is triggered and automatically launches.

Figure 2:
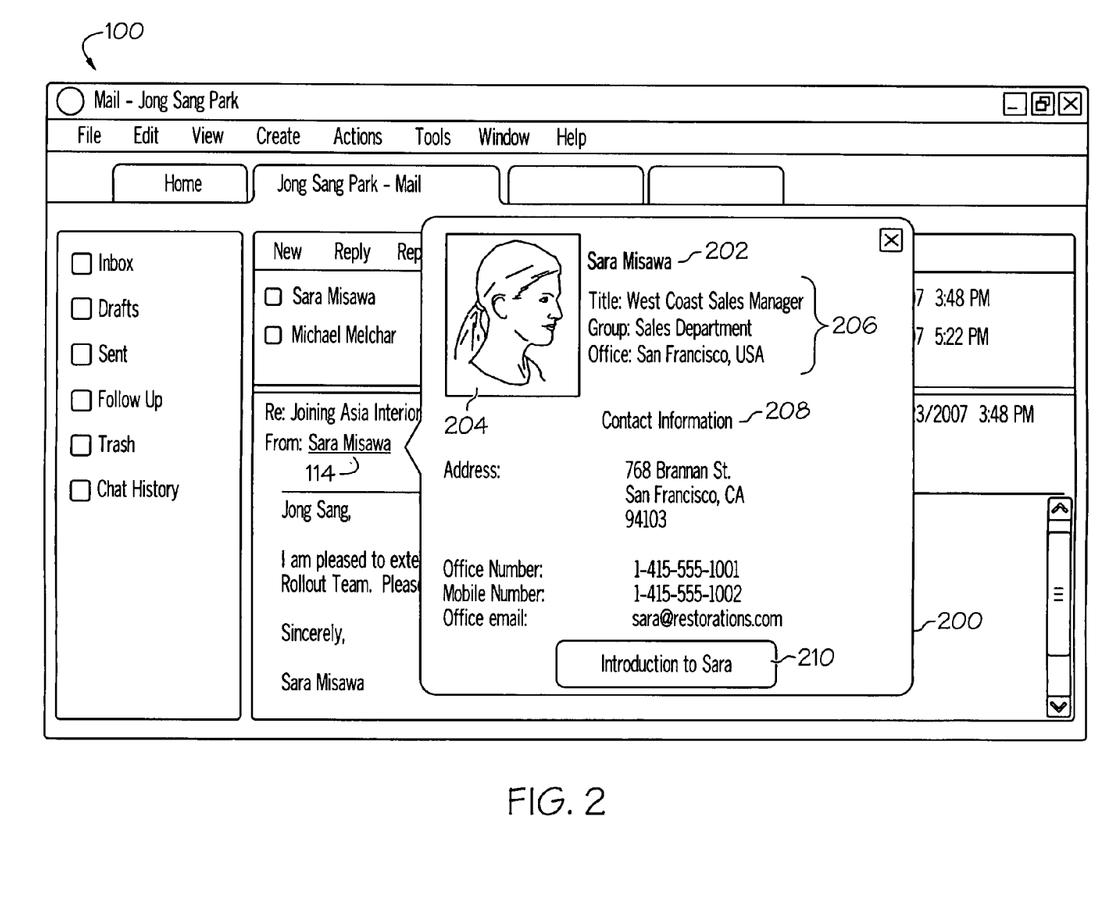
FIG. 2 is an illustrative diagram showing an introduction pop-up over an e-mail application, according to one embodiment of principles described herein.

FIG. 2 is an illustrative diagram showing an introduction pop-up (200) over an e-mail application (100). In this exemplary embodiment, the introduction pop-up (200) contains information about Sara Misawa. This information includes, for example, Sara Misawa's name (202), a picture of Sara (204), organizational information (206), contact information (208), and a button (210) labeled "Introduction to Sara." In this embodiment, the introduction pop-up (200) contains only rudimentary information about Sara, similar to the information that may be included on a business card. In other embodiments, the pop-up could be more extensive, containing a summary of all information available and/or additional links which allow the viewer to access information about Sara in more specific areas of interest. In the example shown in FIG. 2, Jong Sang can click on the button (210) to launch an introduction application which contains more in-depth information about Sara.

Figure 3:
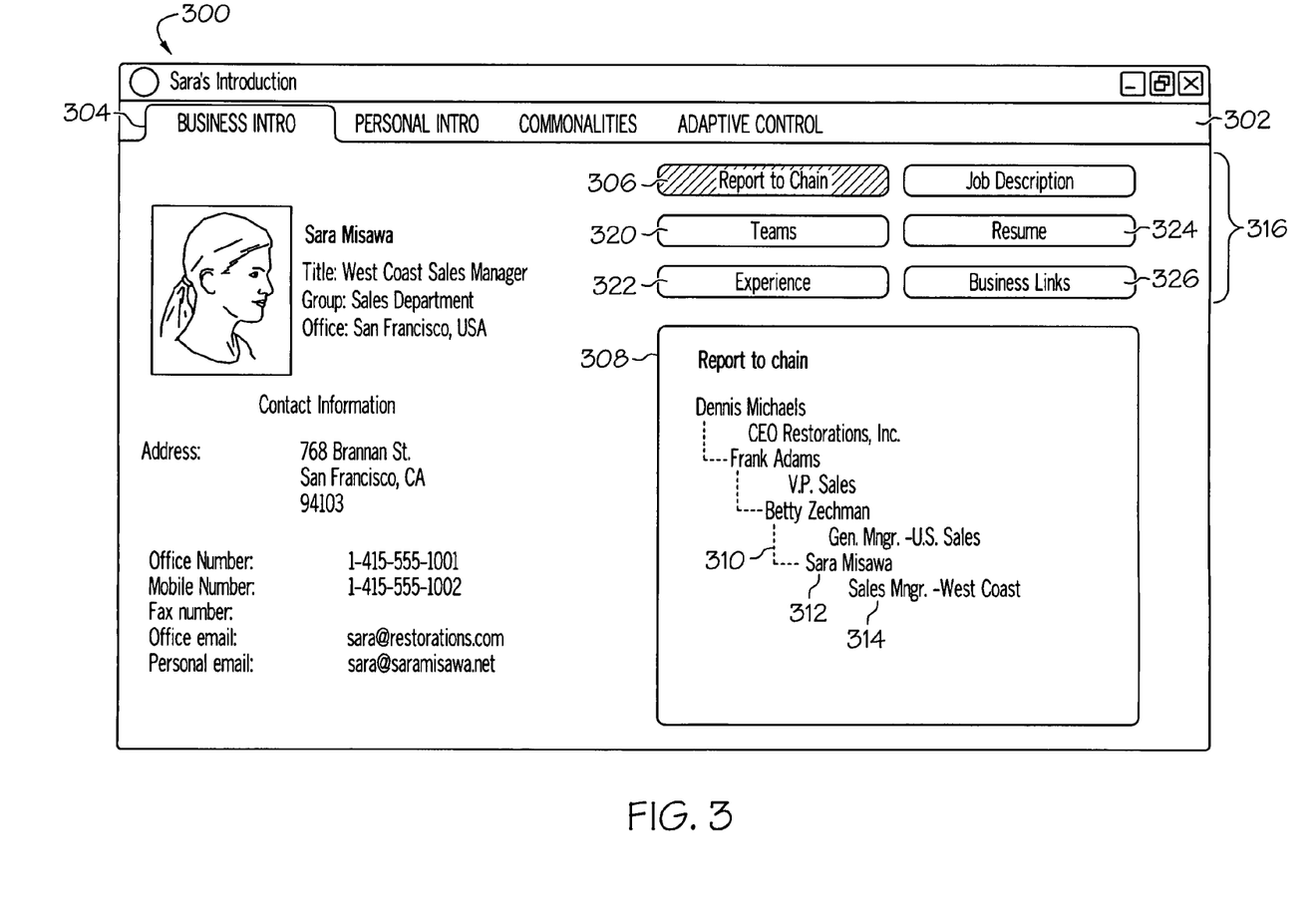
FIG. 3 is an illustrative diagram showing an introduction application, according to one embodiment of principles described herein.

FIG. 3 is an illustrative diagram showing an introduction application (300). According to one exemplary embodiment, the introduction application (300) includes an option bar (302) which provides access to several sections within the application. For example, a first tab may be a business introduction tab (304). In the business introduction tab (304), the information in the pop-up (200) may also be included along with other business related information which may be helpful to inform Jong Sang's response to Sara's e-mail. In one embodiment, the information may be accessed by pressing one of a number of option buttons (316). Upon pressing one of the buttons (316), additional information is shown in the display window (308). In the example shown in FIG. 3, Jong Sang has pressed the "Report to Chain" button (306). The display window (308) then shows Sara's position within the organizational hierarchy. In this exemplary embodiment, both the name and the title of the individuals within the report chain are shown. For example, Sara's name (312) and title (314) are shown at the bottom of the reporting chain. A dotted line (310) connects Sara to her superior, Betty Zechman who is the general manager of U.S. sales. Betty reports to Frank Adams, the vice president for sales, who in turn reports to Dennis Michaels, the CEO of the organization.

A variety of other information may be accessed by mousing over or otherwise activating the option buttons (316). The option buttons may be labeled, for example, "Teams," "Experience," "Job Description," "Resume," and "Business links." By way of example and not limitation, the "Teams" button (320) may provide information about Sara's experience as a team member and in leading teams. The "Teams" screen may have information about teams Sara has created within the organization, including the team members, the project types, and the outcome of the team effort. Similarly, the "Experience" button (322) may give additional details about Sara's experience within the organization, including her past positions and titles, the length of time she has worked for the organization, or relevant outside information. The "Resume" button (324) may display Sara's professional resume in the display window (308) or may provide a link directing the introduction application (300) to access an outside file. The option buttons (316) are merely examples of possible information which could be provided in an introduction to familiarize the recipient with the sender's business background. By way of example and not limitation, the introduction may contain information relating to signature and contractual authority. This information may be valuable for an outside entity considering entering into a contract with the organization through Sara.

Figure 4:
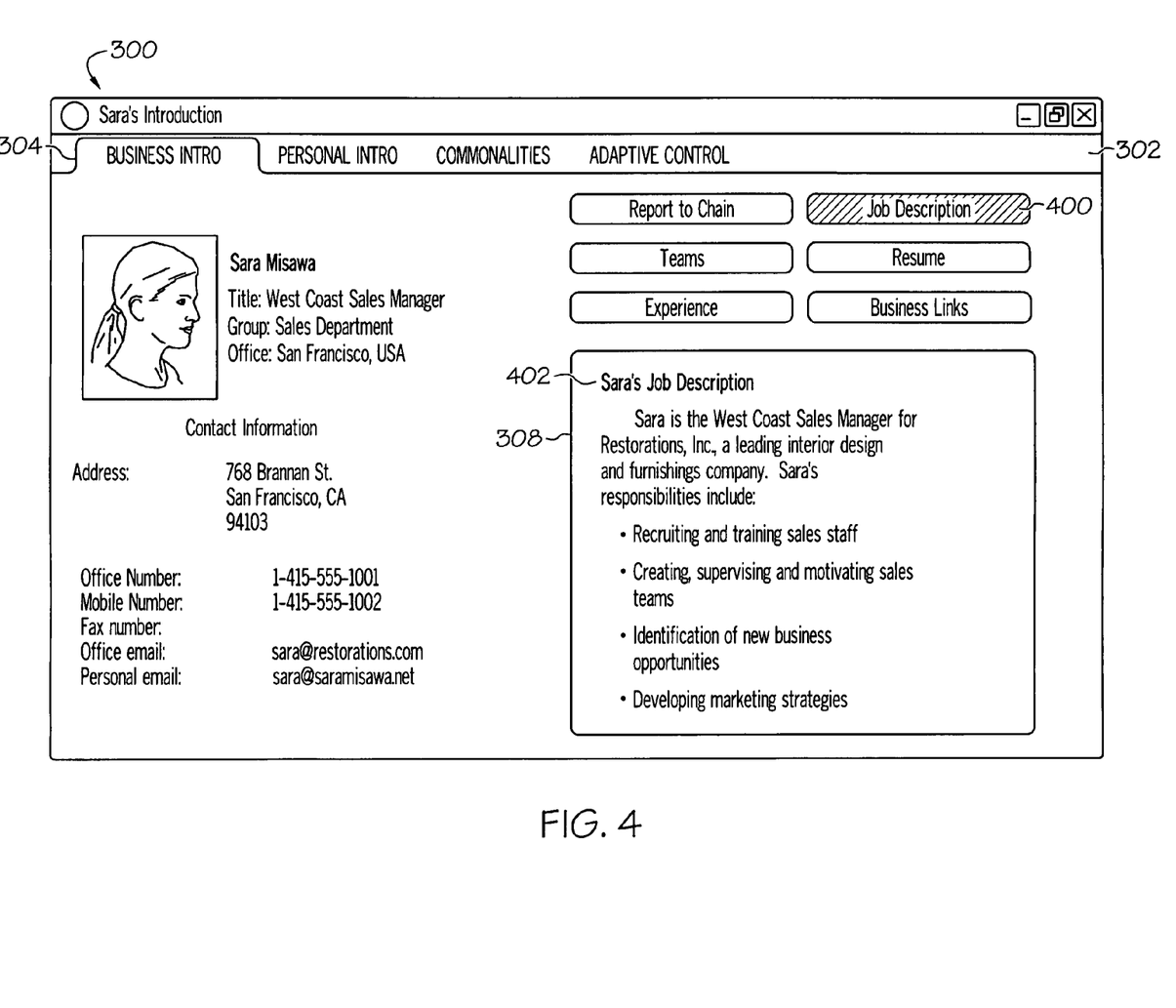
FIG. 4 is an illustrative diagram of an introduction application displaying job description details, according to one embodiment of principles described herein.

FIG. 4 is an illustrative diagram of an introduction application (300) displaying job description details. In FIG. 4, Jong Sang has pressed the "Job Description" button (400). Sara's job description (402) is then shown in the display window (308). The job description reports that Sara's responsibilities include recruiting and training sales staff, creating teams, identify new business opportunities, and developing market strategies. Jong Sang will likely find this information valuable in assessing Sara's authority to create and manage the team he has been invited to join.

Figure 5:
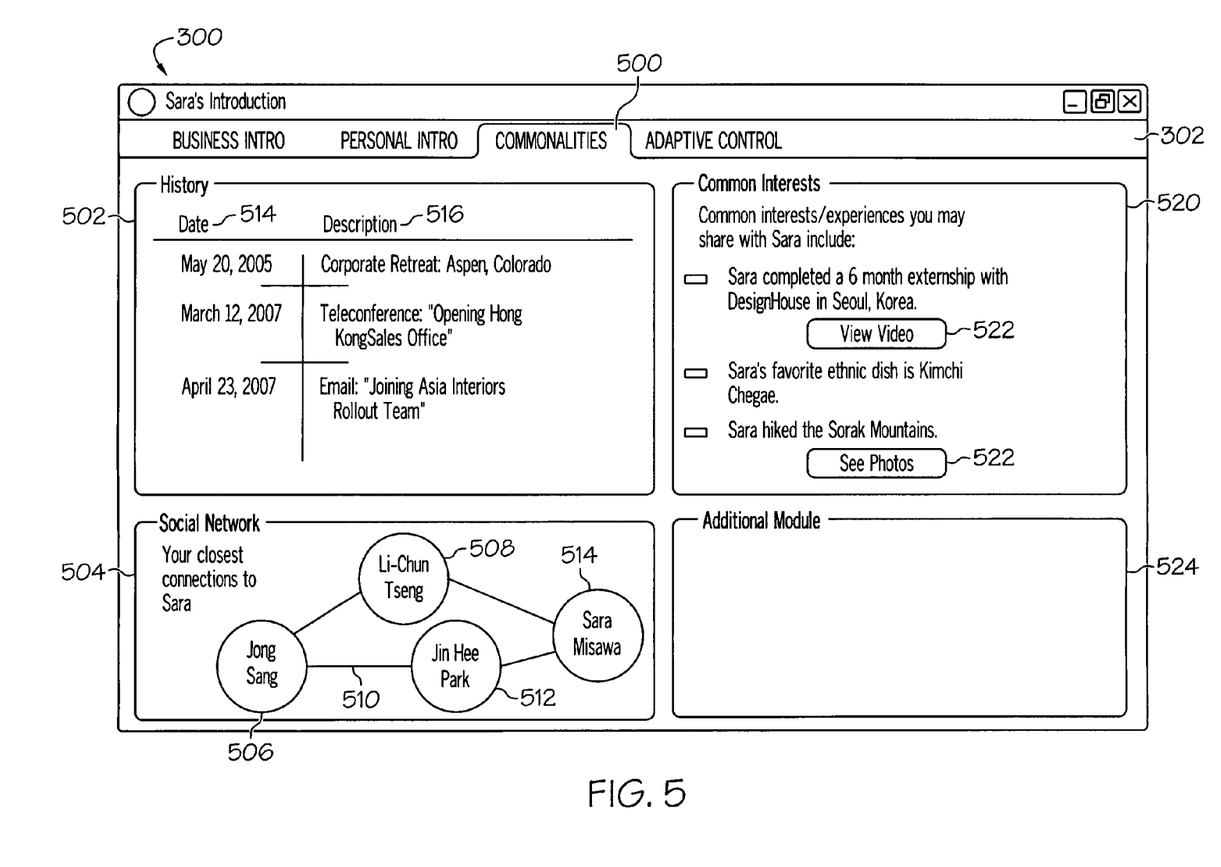
FIG. 5 is an illustrative diagram of an introduction application showing exemplary commonalities between the sender and recipient, according to one embodiment of principles described herein.

FIG. 5 is an illustrative diagram of an introduction application (300) showing exemplary commonalities between the sender and recipient. A "commonalities" tab (500) within the options bar (302) allows the user to access information connecting the sender and the recipient. Commonalities may be presented in a variety of modules including, but not limited to, a history module (502), a social network module (504), and a common interests module (520). Additional modules (524) can be added by the organization, the sender, or the recipient. The commonalities listed may be determined electronically by comparing information of record about Sara and Jong Sang to determine commonalities of which both may be unaware.

According to one exemplary embodiment, the history module (502) includes a history of interactions between the sender and the recipient. In the example shown in FIG. 5, the history module (502) has a date column (514) and a description column (516). The date column contains the date the interaction occurred and the description column (516) contains a brief description of the interaction.

The first interaction between Sara and Jong Sang occurred May 20, 2005 at a corporate retreat in Aspen, Colo. It is likely that a number of individuals from the organization attended the corporate retreat and that Jong Sang simply does not remember seeing or speaking with Sara during the retreat. However, the database may record and be able to identify that both the sender, Sara, and the recipient, Jong Sang, attended the retreat. Accordingly, a commonality is identified. The next interaction occurred on Mar. 12, 2007 when Jong Sang participated on a teleconference titled "Opening Hong Kong Sales Office." Once again, there may have been a variety of people a participating on the teleconference and the opportunity for building professional relationships between the participants may have been limited. The last interaction occurred on Apr. 23, 2007 when Jong Sang received an e-mail titled "Joining Asia Interiors Rollout Team."

The history module (502) may contain much more extensive information than the simple example illustrated in FIG. 5. By way of example and not limitation, the description column may include links to further information about the interaction. When an e-mail is referenced in the history, there may be a link which provides access to the full text of the e-mail. The teleconference entry may contain a link to the minutes and attendance at the teleconference. The corporate retreat may contain a link or other connection to the agenda, presentations, or other items in which Sara or Jong Sang participated.

The information displayed in the history module (502) may be obtained from a variety of sources. By way of example and not limitation, the history module (502) may contain references to instant messaging conversations, blog interactions, e-mails, wiki entries, teleconferences, team-based interactions, and any other interactions which are electronically accessible. The introduction application (300) may gather this information through searches on internal or external databases, from calendaring or collaboration software, specialized organizational databases such as a light weigh directory access protocol (LDAP) server, or other sources.

The social network module (504) illustrates social connections between the sender and recipient. In this example, the names of individuals are enclosed within circles (506, 508, 512, 514) and the relationships between individuals are shown by lines (510) that extend between the circles. The social network module (504) shows the Jong Sang (506) has a least two close connections to Sara Misawa (514). Jong Sang's first connection to Sara is through his superior, Li-Chun Tseng (508). Li-Chun Tseng (508) has worked with Sara (514) on numerous occasions and represents a solid professional connection between Jong Sang (506) and Sara Misawa (514). However, Jong Sang (506) may be surprised to know that his sister Jin Hee Park (512) knows Sara Misawa (514). One of the values of the introduction application being described includes the discovery of complex relationships between individuals. In this case, the introduction application may have searched a variety of social networking databases such as Facebook or Linkedin to discover connections between Jong Sang and Sara.

The common interests module (520) includes common interests or experiences that Jong Sang may share with Sara. During face-to-face introductions, common interests and experiences are often exchanged as a method of building a relationship of trust and providing context for the relationship. The common interests module (520) includes information discovered and analyzed by the introduction application (300) which may represent interests or experiences that Sara and Jong Sang share. The criteria for determining if a common interest exists may include temporal criteria, geographic criteria, or matching specific information between profiles of Jong Sang and Sara Misawa. For example, the introduction application (300) may have identified Jong Sang's present location as Seoul, Korea. The introduction application (300) then searches Sara's profile to determine if any of the included or discovered data is relevant to that location. According to one example, the introduction application (300) determined that Sara completed a six month externship with DesignHouse in Seoul, Korea. Because of the geographic congruity between information contained in Jong Sang's profile information contained in Sara's profile, the application determined that the data may represent a common interest or experience. The introduction application (300) also determined that there is additional information about Sara's externship with DesignHouse and provided a link (522) to a video which describes a portion of Sara's experience. By way of example and not limitation, the introduction application (300) may have discovered the video content on a website such as YouTube and is simply providing a link to the publicly available video.

Similarly, the introduction application (300) shows that Sara's favorite ethnic dish is Kimchi Chegea and that Sara hiked the Sorak Mountains. The introduction application (300) determined that there are photos available which show Sara's hiking trip and included a link to these photos in the common interests module (520). By way of example and not limitation, the introduction application (300) may have obtained this information from searching Flickr or another online photo storage and display site. Each of these common interests/experiences may help to build a relationship of trust between Jong Sang and Sara. The information provided in the "Commonalities" tab (500) may reassure Jong Sang that Sara has an informed perspective on interior design in Asia and that Sara can interact appropriately within the Korean culture.

It will be understood by those of skill in the art that the introduction application (300) described in these examples is only one exemplary embodiment of methods for presenting adaptive electronic introductions. By way of example and not limitation, the introduction application (300) may merely be an interface supported by a more in-depth program and database contained on a server. Additionally, the introduction application (300) may be platform neutral and have features with which allow it to be utilized on a variety of hardware including personal digital assistants (PDAs), cell phones, laptop computers and/or desktop computers.

Figure 6:
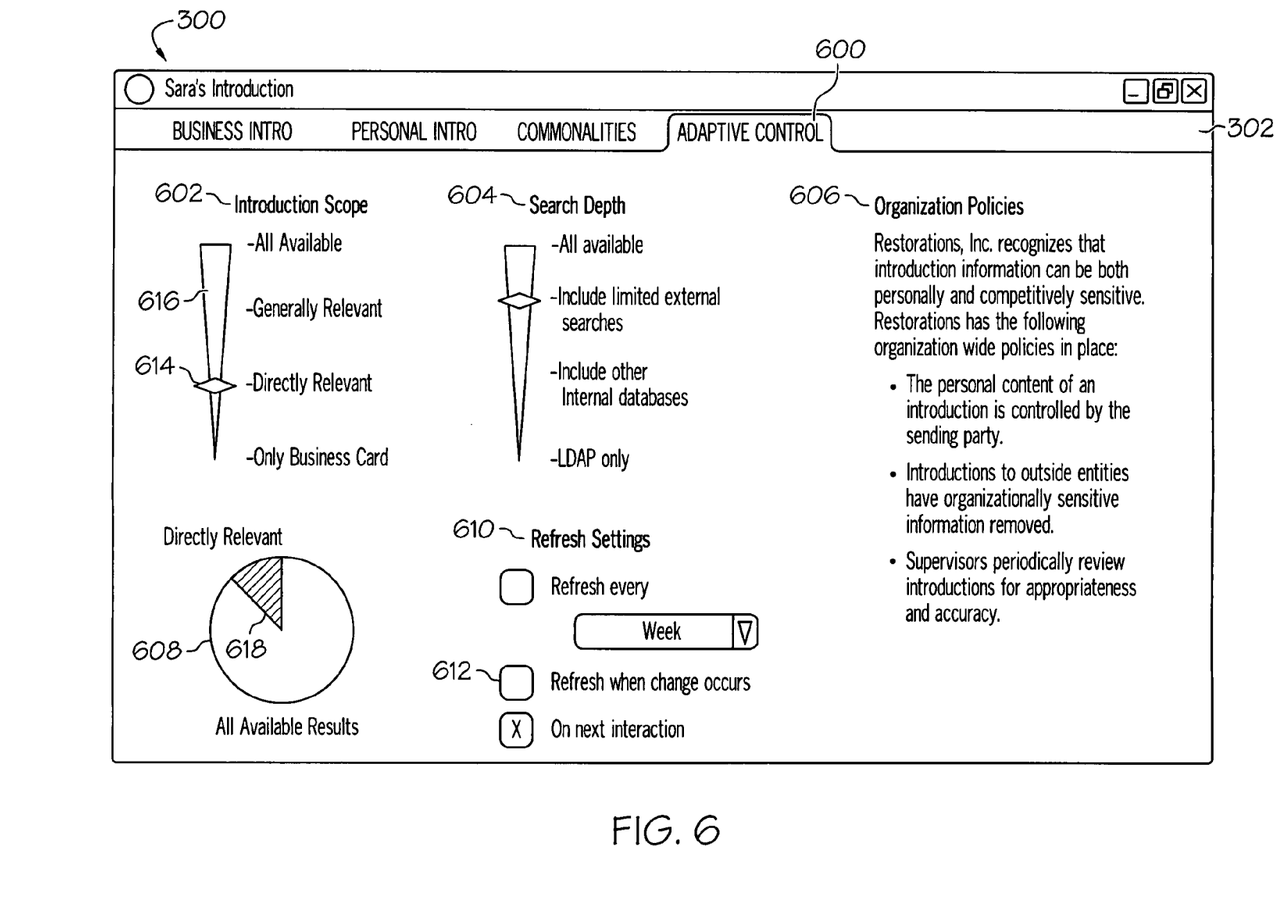
FIG. 6 is an illustrative diagram of an introduction application showing adaptive controls, according to one embodiment of principles described herein.

FIG. 6 is an illustrative diagram of an introduction application (300) showing adaptive controls. According to one exemplary embodiment, an adaptive control tab (600) provides the ability for the recipient, sender, or organization to customize the acquisition, presentation, and analysis of data. By way of example and not limitation, the adaptive controls may include an "Introduction Scope" control (602) a "Search Depth" control (604), a visual display element (608), "Refresh Settings" options (610), and information on organizational policies (606).

The "Introduction Scope" control (602) may take a variety of forms including a bar (616) over which a slider (614) can be moved to change the amount of information presented in a given introduction. By way of example and not limitation, at the lowest position the slider (614) indicates that only information regularly contained within a business card would be presented within the introduction. If this option were selected, the pop-up (200, FIG. 2) may be the only information presented to the recipient. Other options in the introduction scope control (602) include a presentation of directly relevant material, presentation of generally relevant material, and the presentation of all available material. In this case, Jong Sang has selected the "directly relevant" option by moving the slider (614) on the bar (616) until it aligns with the "directly relevant" text.

The introduction application (300) may use a variety of means for determining relevancy. For example, the introduction application (300) may have access to several hundred data points and connections within Jong Sang's and Sara Misawa social networks. Because Jong Sang has requested that only "directly relevant" information be used in the introduction, the introduction application (300) presents only to direct links between Jong Sang and Sara Misawa as shown in the social network module (504, FIG. 5). If Jong Sang had selected "All Available" as the introduction scope, the introduction application (300) may have displayed all information available about the social networks for both Jong Sang and Sara Misawa.

The search depth control (604) similarly has a bar and a slider that allow the selection of varying search depths. According to one exemplary embodiment, the options may include a lightweight directory access protocol (LDAP) server search only, a second option to search other internal databases, a third and broader option allows for limited search of external sources, and a final option searches all available databases or sources. In this illustration, Jong Sang has moved the slider to the "include limited external searches" option. In this configuration, the introduction application (300) may search designated databases such as YouTube, Flickr, Facebook, Linkedin, and other sites that may contain relevant information.

The search depth control (604) is only one example of a content filter which controls the locations and characteristics of data gathered by the electronic introduction application. Other parameters may include geographic constraints, professional teams, divisions, social networks, etc. According to one exemplary embodiment, the information gathered by the electronic introduction application may be adjusted for each individual sender. For example, if Sara keeps in contact with an old high school classmate, Sara may adjust the search parameters to search in depth for local news in her hometown and social network information about her former classmates. The electronic introduction application includes the information relevant to the relationship between Sara and her former classmate in conjunction with communications Sara receives from her former classmate. This information will assist Sara in maintaining the relationship even though Sara and her former classmate may only communicate periodically.

A variety of visual display elements could be used to assist the user in appropriately adjusting controls. By of example and not limitation a visual display (608) may show the total quantity of available results found by the introduction application (300) as a result of the searching at the depth indicated by the search depth control (604). The portion of the total available results which are displayed (618) can be controlled by adjusting the introduction scope control (602).

The organizational policy statement (606) may have a variety of controls which allow the organization to maintain integrity, efficiency, and privacy within the organization. By way of example and not limitation, Sara and Jong Sang's employer, Restorations, Inc., has several organization-wide policies in place with respect to electronic introductions. A first policy is that the personal content of introduction is controlled by the sending party. This policy may be in place to protect the privacy of individuals by allowing the sending party to restrict access to their personal details. Another policy is that introductions sent to outside entities are scrubbed to remove organizationally sensitive information. This may protect competition sensitive information from disclosure outside the organization. A third policy is that supervisors periodically review introductions of their subordinates for appropriateness and accuracy. This policing function allows the organization to maintain standards of professionalism and improves the level of trust associated with introductions from that organization.

Depending on the organizational policies and settings within the introduction application (300) various controls may be available only to certain parties. By way of example and not limitation, the search depth control (604) may be locked by the sending party prior to attaching the introduction to the communication. Additional controls could also be available. For example, a function which protects the personal information of the sending party or a control which restricts the access of the introduction application to the recipient's information could be included. Additionally a function may be incorporated which changes various parameters depending on the identity of the recipient. By way of example and not limitation, if an introduction is sent to an external party, competition sensitive information such as the organizational structure, job description, personnel names, or other sensitive information may be filtered out of the introduction.

The refresh settings options (610) allow the recipient, sender, organization or other entity to control the rate at which the introduction will be updated. Although the information may be current when it was originally sent, over time, the data may become outdated. By way of example and not limitation, if Sara Misawa is promoted to a new position, her prior introductions would no longer be accurate. Accordingly, introduction information should be updated to reflect Sara's new position. The refresh options may include an option to refresh at a set interval, such as refreshing every week. Another option may be to refresh when a change occurs to settings or information within the profiles. The refreshing process may also be triggered by the next interaction between the two parties.

It will be appreciated by those of skill in the art that only a small number of possible adaptive controls are illustrated. A wide variety of additional controls could be incorporated. By way of example and not limitation, the introduction between two parties may be adapted over time to support the relationship. The initial introduction may be fairly extensive to provide an in-depth background for each party. Subsequent introductions may focus only on information that has changed since the last interaction. However, if a long period of time passes between interactions between the two parties, the introduction information sent on the next interaction may be more extensive to refresh their memories. A variety of settings, filters, rules, and other controls can be utilized to optimize temporal adaptation of the electronic introduction.

Additionally, aspects of the content exchange may be tailored or influenced by the content of the collaborative exchange. By way of example and not limitation, during an exchange of e-mails about a specific project, the introduction application may gather and present a much more comprehensive set of background information that is relevant to the specific project. For example, a busy chief executive officer (CEO) may interface with a number of people regarding any one of several dozen projects and initiatives. To facilitate and inform his decision making, the electronic introduction application may "deep dive" into background information, past exchanges relating to the same project, and other related data. When an e-mail from a colleague arrives asking for the CEO's opinion about the progress of a specific project, the electronic introduction application gathers information, analyzes it, and presents information relevant to the colleague's involvement with the project in question, including, for example, prior exchanges between the CEO and that colleague on the project in question. This in-depth information may be particularly useful when dealing with multiple projects or when long periods of time pass before a problem or project is revisited.

To keep from burdening the CEO with too much information, various settings can be used to appropriately tailor the information to the interaction. For example, if the CEO receives several e-mails a day from a colleague regarding a specific project, the electronic introduction application may present only a cursory summary of the most relevant information. In one exemplary embodiment, the summary may contain links to more in-depth information. If the CEO desires more information relating to a specific point, he can follow the link to obtain the information. As will be appreciated by those skilled in the art, the CEO is used here merely as an example. The same principles can be applied to any recipient who is receiving email using the system and methods being described.

There are a variety of methods for processing and displaying adaptive electronic introductions. As discussed above, the content may be tailored by the sender, recipient, and/or corporate policy specifications. These processing activities may be done on both client and server systems. In some cases, where a sender and receiver have differing specifications for what information is to be shared, the information may be processed by both the sender and receiver systems. In another embodiment, a server will process and collect content in a generic manner, and the client side can gather additional information based on the receiving user or sending user preferences.

According to one exemplary embodiment, the display, user interface, filtering, adaptive controls and other aspects of electronic introduction are open-ended. The individual entities utilizing deployments of the electronic introduction have the ability to configure the content delivery to suit their own need and desires. This personalization can be at a level beyond the implementation of corporate policy, sender filtering, existing controls/options, etc. For example, the personalization of the electronic introduction process can occur through programmatic interfaces or application programming interfaces (APIs). According to one exemplary embodiment, the ability to create custom controls and display options could be directly integrated into the electronic introduction application. These programmatic interfaces or APIs may allow a wide variety of alterations to the electronic introduction process and display. For example, additional tabs, controls, and options may be altered or created within the electronic introduction application.

Figure 7:
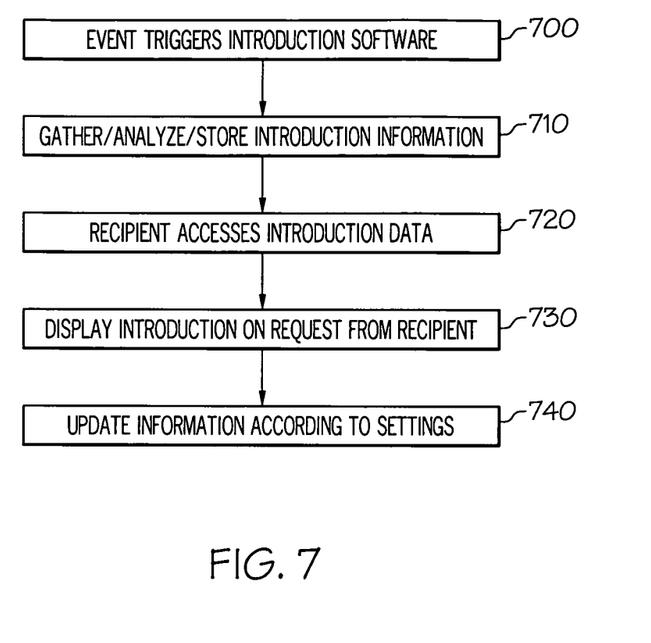
FIG. 7 is flowchart showing an illustrative method for providing adaptive electronic introductions according to one embodiment of principles described herein.

FIG. 7 is flowchart showing an illustrative method for providing adaptive electronic introductions. According to this exemplary embodiment, an event triggers the introduction software to search and analyze data to generate an introduction (step 700). The triggering event may be the creation of a new employee file, the sending of an e-mail, an invitation to join a teleconference, or other action. In response to the triggering event, the introduction software gatherers, analyzes, and stores introduction information for a particular individual (step 710). When that person then acts as the sender or originator of a communication, the recipient accesses the introduction data to gain additional perspective and background on about the sending party (step 720). By way of example and not limitation, the recipient may access the introduction data by clicking on the link in the message, by mousing over a particular area, or by selecting active text. The recipient may also access the introduction data through a corporate website, social networking community, blog, or any other access point where it is may be desirable for an introduction to be made.

The recipient may access the introduction data through a variety of platforms including an introduction application, software browser, collaboration software, or other interface. The introduction data is displayed after the request from the recipient is received (step 730). According to one exemplary embodiment, the introduction may comprise a single page of information through which the recipient can browse. In other embodiments, the recipient may click on multiple embedded links tabs or navigational features to view the desired information. The information is updated to keep the introduction current (step 740). According to one exemplary embodiment, various settings are available to control each step of the process. These settings may be accessed by the sender, the recipient, the sender's organization, the recipient's organization, default settings within the software, or other entities. According to one exemplary embodiment, a controlling organization may set policy which restricts access to various controls by some parties.

Figure 8:
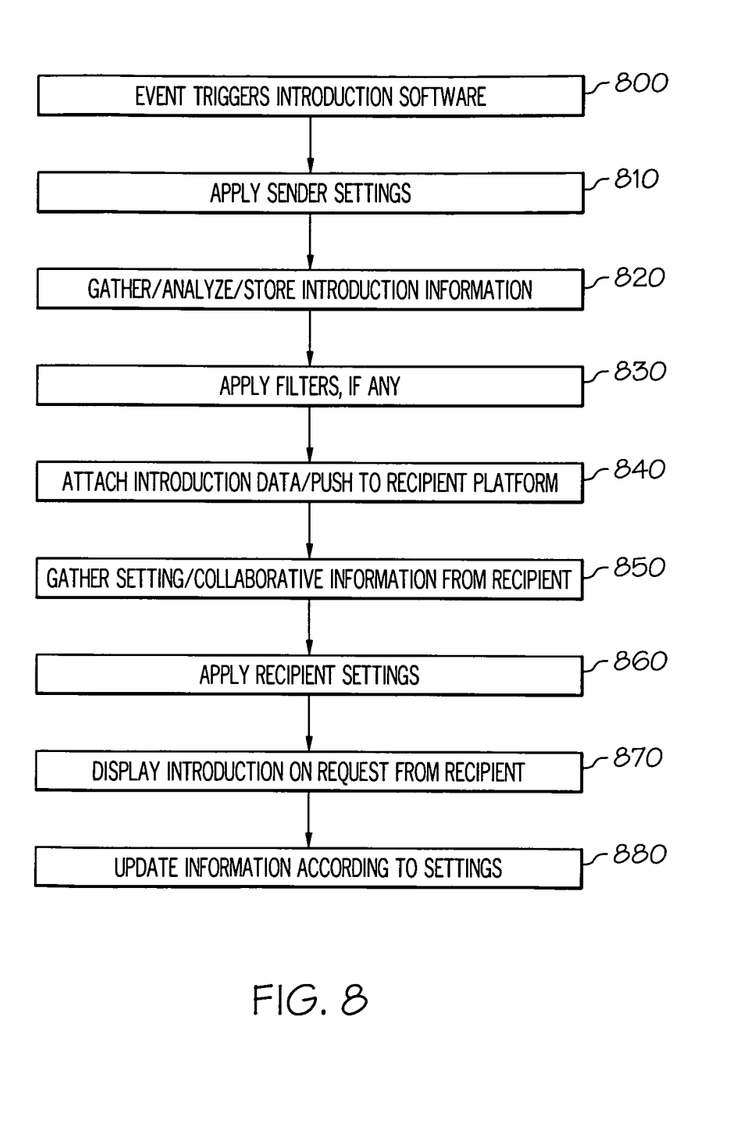
FIG. 8 is a flowchart showing an illustrative method for providing adaptive electronic introductions, according to one embodiment of principles described herein.

FIG. 8 is a flowchart illustrating a more detailed approach to providing adaptive electronic introductions. An event triggers the introduction software to create a new introduction profile (step 800). Before searching for information, the introduction software applies settings input by the person about whom the introduction profile is being created, referred to here as the sender (step 810). By way of example and not limitation, these sender settings may include privacy restrictions, scope restrictions, or other restrictions. Within the parameters defined by the sender settings, the introduction software than gatherers, analyzes, and stores the introduction information (step 820). The step of gathering, analyzing, and storing information can take a variety of forms. By way of example and not limitation, the introduction information may be stored in a central repository, may be stored on the sender's computer, or maybe accessible to the sender or the sender's application through a webpage or portal.

The introduction software may then apply filters to the information that has been gathered (step 830). These filters may include organizational policies, sender preferences, and default settings, or other appropriate filters. By way of example and not limitation, an organization may have policies protecting personal information of the sender, policies against the distribution of copyrighted works without permission, or policies protecting sensitive organization data.

According to one exemplary embodiment, the introduction data is then attached a message and pushed to the recipient (step 840). By way of example and not limitation, the introduction data may be sent within e-mail as an attachment that is accessible to the recipient. In another embodiment, the introduction information is embedded into the e-mail in a manner such that it is not visible as part of the body of the e-mail. In other embodiments, particularly in applications where there are communication bandwidth limitations or memory limitations, the introduction data may be stored at a remote location. The portions of the introduction are communicated to the recipient as they select various options, for example, using links within the e-mail. In many embodiments, it is desirable to push the introduction information to the recipient prior to the recipient's request. This avoids delay in presenting the information and allows the recipient to immediately browse through the introduction information so that they can make a timely determination about whether and how to respond to the sender.

In some examples, the introduction software may gather setting and collaborative information from the recipient (step 850). The recipient setting information is valuable in allowing the recipient to customize the presentation of the electronic introduction. By way of example and not limitation, the recipient may desire to view only the most relevant information within the introduction. These recipient settings may be adjustable on-the-fly by the recipient. For example, if the recipient desires to view more in-depth information in a particular area or use a different method of displaying the data, the recipient could adjust controls and settings to change the introduction display. The recipient's collaborative information may be useful in creating commonality modules. By way of example and not limitation, to assemble an interaction history, the introduction software may access the recipients e-mail files, instant messaging chat scripts, appointment calendar, or other data. This interaction history may help identify a chain of events or interactions between the sender and the recipient.

The introduction software then applies the recipient settings (step 860) and displays the introduction upon request from the recipient (step 870). After the introduction information has been viewed, the introduction software updates the introduction information according to settings (step 880) to prevent the information from becoming stale or unrepresentative of the interactions and identities of the parties. By way of example and not limitation, the update settings may include an option to refresh periodically, an option to refresh when a change occurs in the profile of either party, an option to refresh when a change in settings is made, or the option to refresh may be triggered by the next interaction between the two parties.

In sum, adaptive electronic introductions provide easily accessible information to build relationships, provide context for decisions, and respond to requests for support. An adaptive electronic introduction may include business, interaction, personal, commonality, and other data. An adaptive electronic introduction may search a plurality of resources to extract relevant information, which is then analyzed and stored. At the request of the sending party, the introduction information is provided to the recipient. The recipient may then view the electronic introduction. The introduction information is refreshed periodically and may be adapted to support ongoing interactions between the two parties. The process may be controlled by utilizing a variety of controls and settings. The controls and settings may include refresh frequency, search depth, the amount of information displayed, content filters, and other parameters. According to one exemplary embodiment, this introduction model is extended to all forms of collaboration including electronic mail, web conferencing, video conferencing, instant messaging, electronic invitations, wikis, blogs, social bookmarking, etc.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims.

What is claimed is:

1. A method for providing adaptive electronic introductions comprising:
    setting control parameters within an adaptive electronic introductions application;
    automatically generating an electronic introduction according to said control parameters;
    associating said adaptive electronic introduction with an electronic communication from a sender to a recipient; wherein said automatically generating an electronic introduction comprises
    searching databases for information about both said sender and said recipient;
    comparing information about said sender and said recipient for commonalities;
    including at least a portion of said commonalities in said electronic introduction; and
    automatically updating said electronic introduction with said electronic introductions application; said automatically updating said electronic introduction being triggered by a next interaction between said sender and said recipient.

2. The method of claim 1, further comprising filtering information of said electronic introduction according to recipient settings, said recipient settings comprising a scope setting providing the recipient control over an amount of data displayed in the adaptive electronic introduction.

3. The method of claim 2, further comprising displaying a visual indication of a proportion of data being hidden as a result of a given scope setting.

4. A method for providing adaptive electronic introductions comprising:

setting control parameters within an adaptive electronic introductions application;

automatically generating an electronic introduction according to said control parameters;

associating said adaptive electronic introduction with an electronic communication from a sender to a recipient;

wherein said automatically generating an electronic introduction comprises searching databases for information about both said sender and said recipient;

comparing information about said sender and said recipient for commonalities; and including at least a portion of said commonalities in said electronic introduction;

wherein said electronic introduction comprises an identification of the sender within an organizational hierarchy, said identification of the sender comprising identifying the sender's report to superiors.

5. A method for providing adaptive electronic introductions comprising:

setting control parameters within an adaptive electronic introductions application;

automatically generating an electronic introduction according to said control parameters;

associating said adaptive electronic introduction with an electronic communication from a sender to a recipient;

wherein said automatically generating an electronic introduction comprises searching databases for information about both said sender and said recipient;

comparing information about said sender and said recipient for commonalities;

including at least a portion of said commonalities in said electronic introduction; and pushing said electronic introduction to a recipient platform prior to a request by a recipient to access said electronic introduction.

6. A system for providing an electronic introduction comprising:

a computer configured to search at least one database for information about a party being introduced and compile an electronic introduction for said party incorporating said information and create a temporal adaptation of said electronic introduction, content of said temporal adaptation being at least partially controlled according to an amount of time which elapsed between a preceding electronic communication between said sender and said recipient and a current electronic communication between said sender and said recipient; and an electronic communication function configured to provide access to said temporal adaptation of said electronic introduction to a recipient of an electronic communication sent by said party using said electronic communication function.

7. A method for providing adaptive electronic introductions comprising:

setting control parameters within an adaptive electronic introductions application;

automatically generating an electronic introduction according to said control parameters;

associating said adaptive electronic introduction with an electronic communication from a sender to a recipient;

wherein said automatically generating an electronic introduction comprises searching databases for information about both said sender and said recipient;

comparing information about said sender and said recipient for commonalities;

including at least a portion of said commonalities in said electronic introduction; and tailoring content and search scope of said adaptive electronic introduction according to content of a collaborative exchange between said sender and said recipient.

* * * * *